Feb. 20, 1951 A. H. DAVIS ET AL 2,542,634
DUST SEPARATOR
Filed Nov. 29, 1947 5 Sheets-Sheet 1
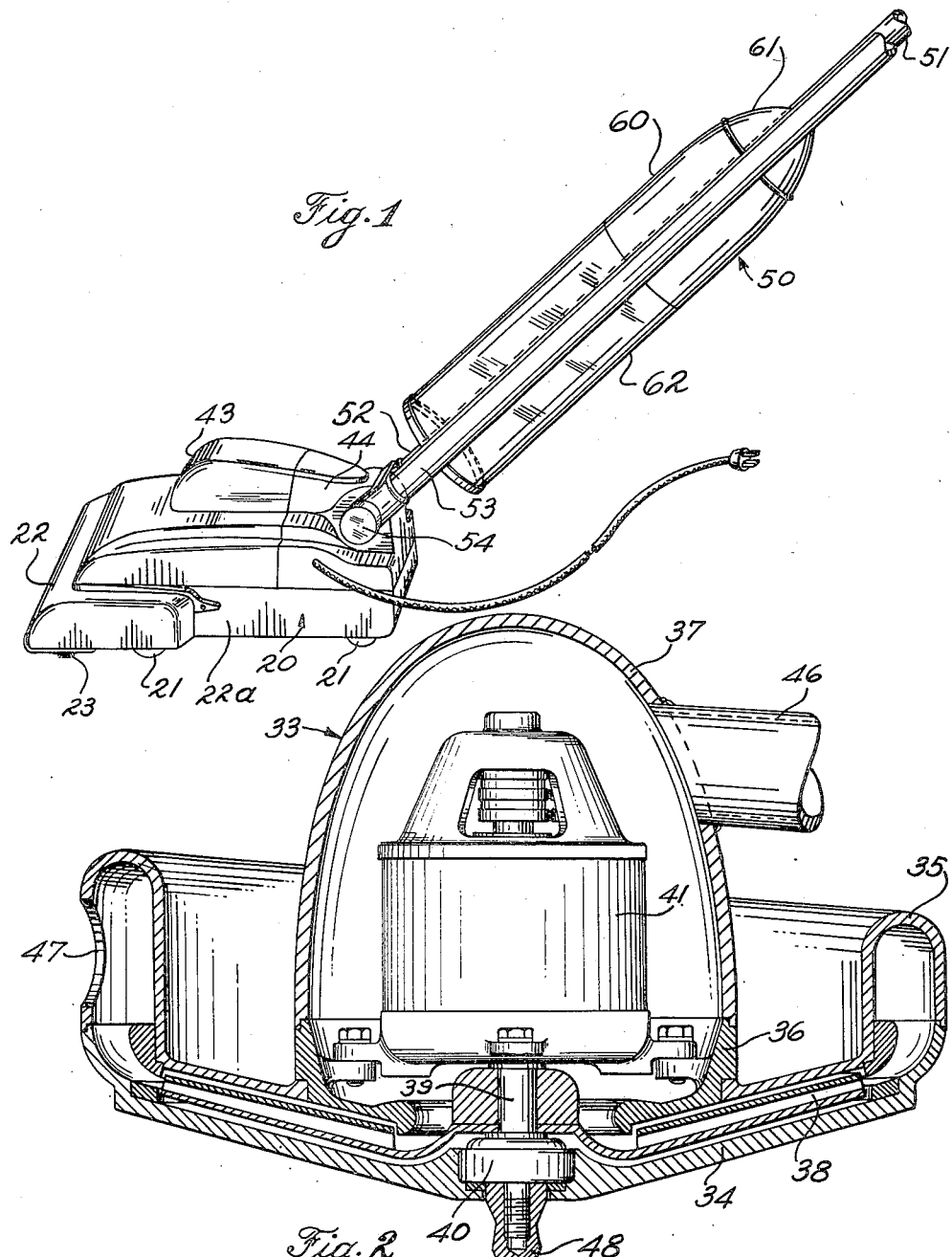
INVENTORS
ARCHIBALD H. DAVIS
& CHARLES N. HAY
BY Richey & Watts
ATTORNEYS

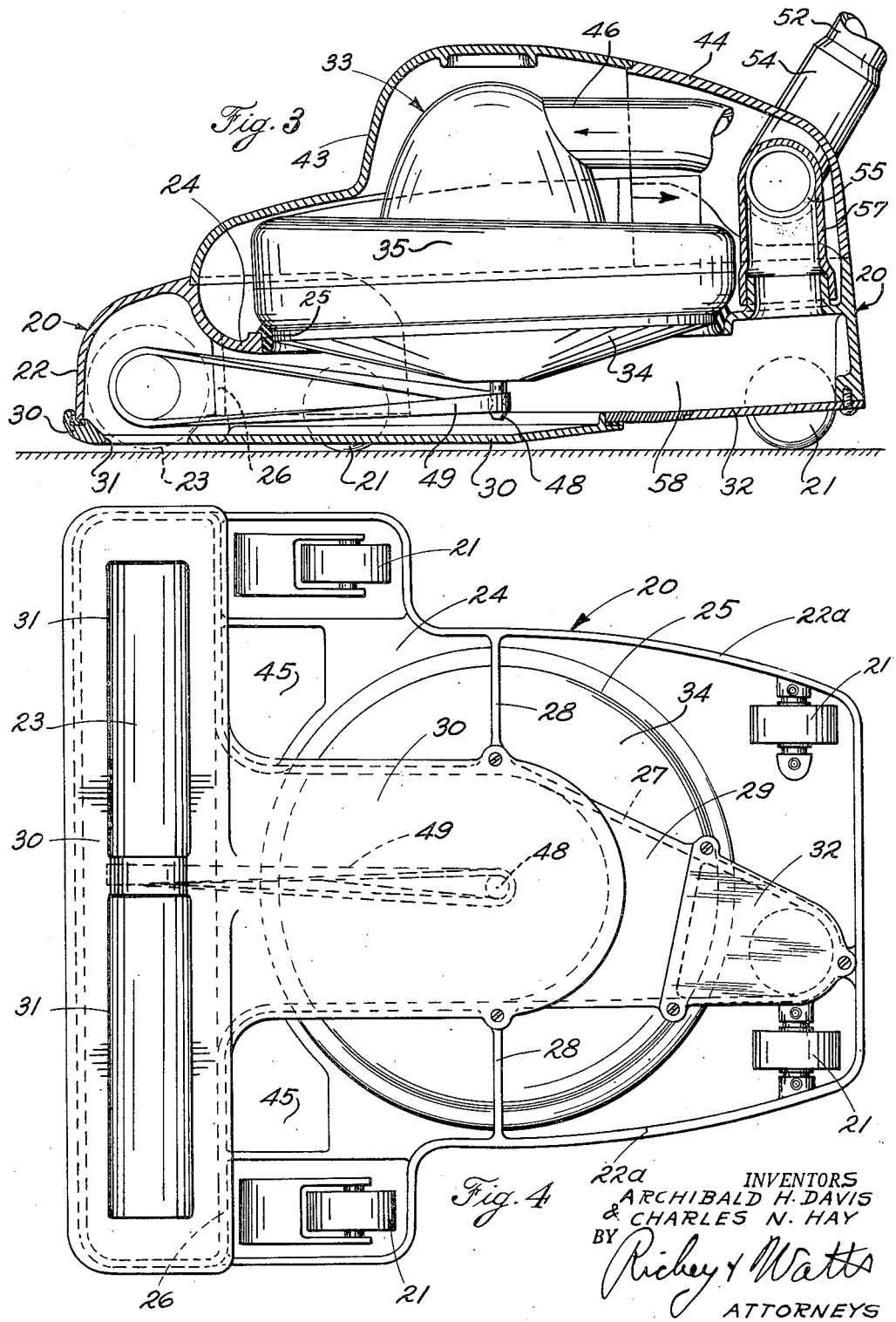

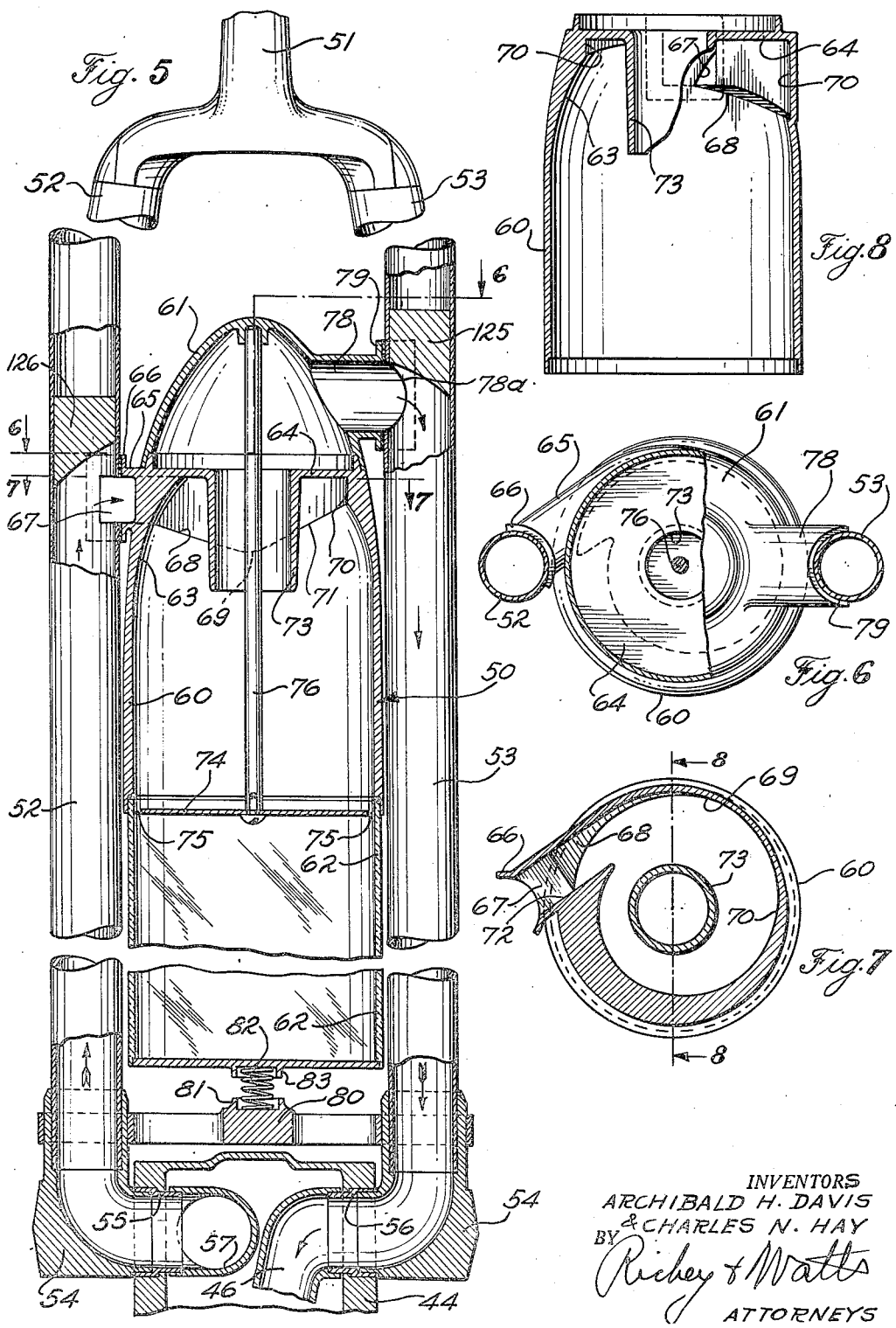

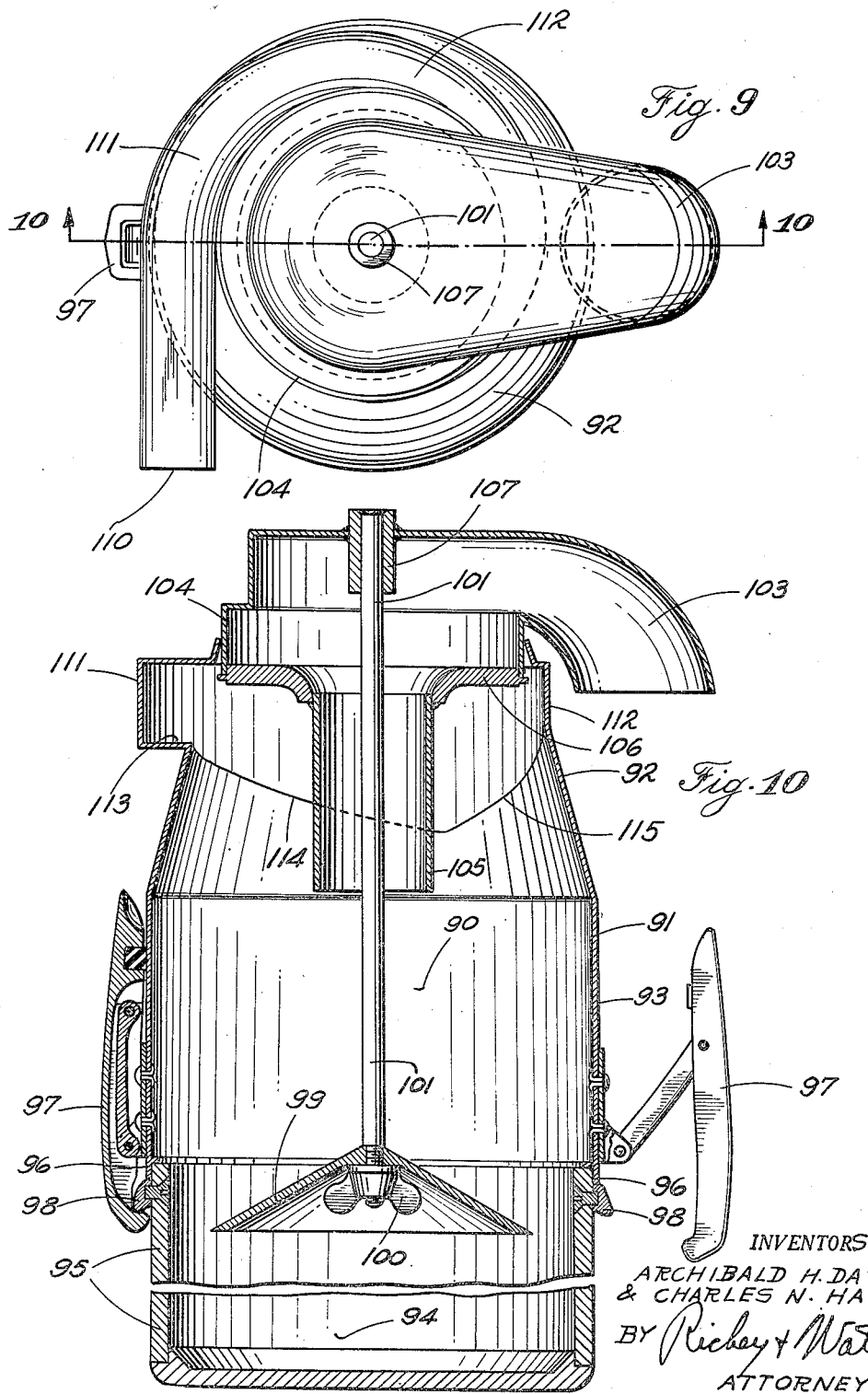

Feb. 20, 1951 A. H. DAVIS ET AL 2,542,634
DUST SEPARATOR
Filed Nov. 29, 1947 5 Sheets-Sheet 5

INVENTORS
ARCHIBALD H. DAVIS
& CHARLES N. HAY
BY Richey & Watts
ATTORNEYS

Patented Feb. 20, 1951

2,542,634

UNITED STATES PATENT OFFICE 2,542,634

DUST SEPARATOR

Archibald H. Davis and Charles N. Hay, Sandusky, Ohio, assignors to The Apex Electrical Mfg. Co., Cleveland, Ohio, a corporation of Ohio Application November 29, 1947, Serial No. 788,850

3 Claims. (Cl. 183—83)

This invention relates to vacuum cleaners and to the separation of solid matter from gas by the applicaion of centrifugal and other forces to the gas and solid matter.

The principal object of this invention is to eliminate the undesirable dust bag of conventional vacuum cleaners and collect the dust and dirt in a receptacle which may be easily and conveniently emptied and cleaned. Another object is to separate the dust and dirt from the air stream in a vacuum cleaner with such a high degree of efficiency as to eliminate the necessity of using supplemental filters, water traps, and the like. Other objects are to maintain a constant air flow at the nozzle of the cleaner during use, eliminating the decrease of air flow and reduced efficiency in a conventional cleaner as the bag or filter becomes clogged with dirt; and to separate the dust and dirt from the air stream before the air enters the fan or blower, so as to protect the fan from the dust and dirt in the air stream and permit the use of a fan of maximum efficiency.

Another object of this invention is to combine in a single machine the advantages of both the upright or floor type cleaner and the cylinder or tank type cleaner by combining a high efficiency fan with a dirt and dust separator in advance of the fan, so as to obtain the efficiency of the upright type of cleaner in cleaning rugs and the high vacuum characteristic of the tank type of cleaner for opertaing attachment cleaning tools.

Another object of the invention is to improve the centrifugal separation of solids from gases by subjecting the dust laden air to forces which rarefy and accelerate the air in a zone in which separation takes place, so that centrifugal force is increased, the mass of the air is decreased, the viscosity of the air is reduced by the reduction in temperature due to expansion thereby permitting dust particles to move more freely through the air, and the relative humidity of the air is increased so that the dust particles pick up more moisture and are increased in mass. In this way the separating efficiency is increased in an exponential ratio to the pressure drop through the separator, and by the use of a pressure drop of twenty to thirty inches of water complete separation for all practical purposes is obtained.

Further objects of the invention are to improve and increase the efficiency of centrifugal separators of the cyclone type for separating dust and dirt from air to such an extent as to permit the use of such separators in vacuum cleaners; to produce in such a separator a plurality of interacting cyclones producing different amounts of centrifugal force; to collect all of the material separated from the air stream in a single container without interfering with the operation of the cyclones and without permitting any of the separated material to become again entrained in the air stream; to maintain the separating efficiency of the centrifugal separator substantially constant through a wide variation in the quantity of air passing through the separator in a given interval of time, so that the operation of the separator is not affected by variations in the extent to which the nozzle of the vacuum cleaner is sealed against the rug or other surface being cleaned; and to prevent large objects, strings, lint and the like from being caught in the inlet or the outlet of the separator or in the entrance into the dirt collecting receptacle.

These and other objects, which will appear from the following description of preferred embodiments of the invention, are achieved by a new combination and arrangement of elements, and a new method of treating the dust laden air stream, involving the application of centrifugal and other forces to the air and the entrained dust, dirt and other foreign matter. Generally speaking, the dirt laden air stream entering the shell of the separator is subjected to axial and tangential forces of such magnitude as to cause the stream to move in a helical path along the shell and to force entrained solid matter radially toward the shell, the main body of the air stream is then subjected to an axial force in the opposite direction and centripetal forces causing it to move in a smaller helical path in the opposite axial direction from the first helical path so as to develop an increased centrifugal force on the entrained particles, while the foreign matter which has been forced against the wall of the shell continues to move in the first mentioned helical path into a dirt receptacle in which the air is whirling in the same direction as the air in the first helical path, but is sufficiently free of axial currents to prevent separated dust and dirt from being picked up and again suspended in the air. The forces are applied so that the air moving in the inner helical path is considerably reduced in pressure, density, temperature and viscosity and entrained particles are subjected to an increased centrifugal force and are thereby given sufficient velocity and momentum in a radial direction to move through the entering air and into the stream of foreign matter adjacent the shell which enters the dirt receptacle.

Referring to the drawings:

Fig. 1 is a perspective view illustrating the general arrangement of an upright vacuum cleaner according to the invention;

Fig. 2 is a sectional view of a centrifugal fan and motor assembly;

Fig. 3 is a longitudinal sectional view of the cleaner;

Fig. 4 is a bottom view of the same;

Fig. 5 is a view, partly in section, of the preferred form of dust separator and its mounting on the handle of the cleaner;

Figs. 6 and 7 are sectional views of the same taken on the planes indicated in Fig. 5;

Fig. 8 is a section taken on the plane indicated by the line 8—8 of Fig. 7;

Fig. 9 is an end view of a slightly modified form of separator;

Fig. 10 is a longitudinal section of the same on the plane indicated in Fig. 9;

Figure 11:
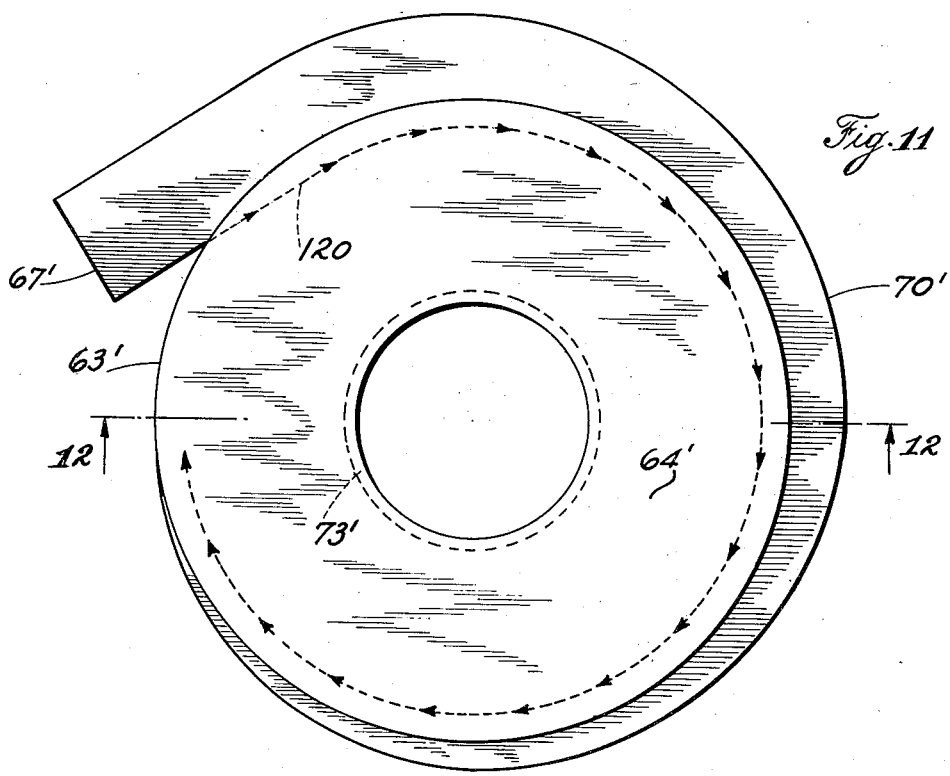
Fig. 11 is a diagrammatic top plan view of an inlet embodying the present invention applied to a different form of separator.

The upright type of vacuum cleaner illustrated in Figs. 1 to 7 may embody a chassis which is a modification of those previously used in upright cleaners, the modification being to incorporate a dust separator and to accommodate the flow of air to and from the separator. In common upright cleaners air flows from the nozzle through the fan to a bag. In a cleaner according to this invention, the air flows from the nozzle through the dust separator, then through the fan, and is discharged into the air. Preferably, the dust collector is mounted on the handle of the cleaner to promote compactness of the body of the machine and to facilitate the disposal of dirt collected by the separator.

In the illustrated embodiment the cleaner includes a frame casting 20 supported by four wheels 21 and having an extension 22 at its forward end forming a nozzle. The casting 20 includes a downwardly extending flange portion 22a which surrounds the cleaner and the wheels 21 and merges into the nozzle portion 22. The casting 20 includes a substantially horizontal wall portion 24 formed with an opening 25 adapted to receive the motor and fan assembly. Downwardly extending wall portions 26 of the casting form the rear walls of the nozzle portion 22 and merge into generally longitudinally extending ribs 27. The ribs 27 extend under the opening 25 and are supported laterally by ribs 28 extending in from the opposite sides of the flange 22a and by an integral web 29 bridging the ribs 27 at one point.

A cover plate 30 is removably secured to the bottom of the nozzle portion 22 and extends rearwardly, spanning the space between the ribs 27 in advance of and contacting the web 29. Openings 31 in the cover plate 30 constitute the nozzle openings through which the brush 23 extends and through which the dust laden air is taken into the cleaner. A cover plate 32 is removably secured to the ribs 27 spanning the space between these ribs rearwardly of and contacting the web 29. This cover plate is also removable to permit the attachment of a suction hose for the usual cleaner attachments.

A motor and fan assembly 33 is secured to the casting 20 with its lower portion extending through the opening 25 in the horizontal plate 24, the junction being sealed by any suitable gasket. The motor and fan assembly includes a fan casing formed by a bottom plate 34 and a channelled rim 35, and a motor housing formed by a support 36 and a cover 37. The centrifugal impeller 38 of the fan is mounted on a shaft 39 rotatable in an antifriction bearing 40 supported in the center of the bottom plate 34. The motor 41 is supported in any convenient manner from the support 36.

A cover plate 43 and a handle pivot casting 44 enclose the motor and fan assembly 33 above the horizontal wall 24, forming a space which is sealed from the nozzle and which is open to atmosphere through holes 45 opening downwardly through the plate 24.

Cleaner attachments which operate by pressure rather than vacuum, such as spray guns and the like may be connected to the openings 45 by a saddle bridging these openings, or in any other convenient way.

An air inlet pipe 46 is secured to and opens into the cover 37, and the periphery of the channelled rim 35 is provided with one or more outlet openings 47 opening into the space within the cover plate 43 and the casting 44. A pulley 48 threaded onto the lower end of the shaft 39 drives the brush 23 through the belt 49.

The dust separator 50 (Figs. 1 and 5) is preferably mounted on the handle 51, which is of tubular construction and is divided, except at its upper end, into two branches 52 and 53 which serve as inlet and outlet conduits, respectively, for the separator. The lower ends of these conduits are mounted in right-angle swivel fittings 54 rotatably received in bushings 55 and 56 fitted in the pivot casting 44. The bushing 56 communicates with the fan inlet pipe 46, and the bushing 55 communicates with a conduit 57 through which the dust laden air flows from the nozzle. The interior of the nozzle 22 is connected to the conduit 57 through a passage 58 between the ribs 27, which is closed on the bottom by the cover plates 30 and 32 and the web 29, and on the top by the horizontal plate 24 and the fan cover plate 34.

The dust separator 50 includes a substantially cylindrical shell portion 60 to which is secured a cap 61. A dust collecting receptacle 62 is removably connected to the lower open end of the shell member 60. At its upper end the shell member 60 has its interior wall converging inwardly in a substantially ellipsoidal shape as indicated at 63 terminating in a top wall 64. A tangential inlet opening is formed in a boss 65 immediately below the top wall 64. The boss 65 projects from the shell 60 and is secured to the tubular member 52 in any suitable way, as by the flange 66 which may be welded to the member 52.

Generally speaking the inlet is a rectangular conduit decreasing in radius and increasing in axial depth proportionately, so as to maintain the desired cross-sectional area, which is wound around the shell about 270° and which is cut away where it is intersected by the upwardly converging walls of the ellipsoidal portion 63. In the preferred arrangement the inlet opening 67, which extends axially through the boss 65, is substantially square in cross section. At the point where the opening 67 breaks into the interior of the ellipsoidal portion 63 the lower flat wall 68 of the inlet opening is inclined axially downward at an angle which, in the preferred form, is such as to increase the axial length of the inlet as the radius decreases, as will be explained. The junction between the downwardly inclined flat bottom wall 68 of the inlet opening and the upwardly converging ellipsoidal side wall 63 of the shell 60 extends circumferentially a short distance about the shell 60 and terminates at the point 69, where the bottom wall of the inlet disappears. The flat top wall of the inlet opening 67 lies in the plane of the top wall 64 of the shell 60. The substantially vertical outer side wall 70 of the inlet opening is formed with a constantly diminishing radius and gradually merges into the ellipsoidal wall 63, the junction being indicated by the line 71 in Fig. 5. The inner vertical side wall 72 of the inlet opening 67 terminates at the point where the inlet breaks into the interior of the shell 60, so that the inlet passage defined by the vertical side wall 70 of constantly diminishing radius and the downwardly inclined bottom wall 68 is open on its inner side to the interior of the shell 60. Thus the inlet opening increases in axial extent and decreases in radius and in radial depth as it progresses circumferentially around the interior of the shell 60 and merges completely into the ellipsoidal shape of the portion 63 of the shell in less than 360°, preferably at about 270°. In this manner a rectangular stream of air entering the casing through the inlet opening 67 expands in an axial direction and decreases in radial depth so as to form a wide thin sheet of air as it engages the ellipsoidal contour of the portion 63, and at the same time the inlet is open on its inner side so that any foreign object small enough to pass through the inlet opening 67 can continue into the interior of the shell 60 without danger of being caught in a position to block or interfere with the inlet opening.

Figure 12:
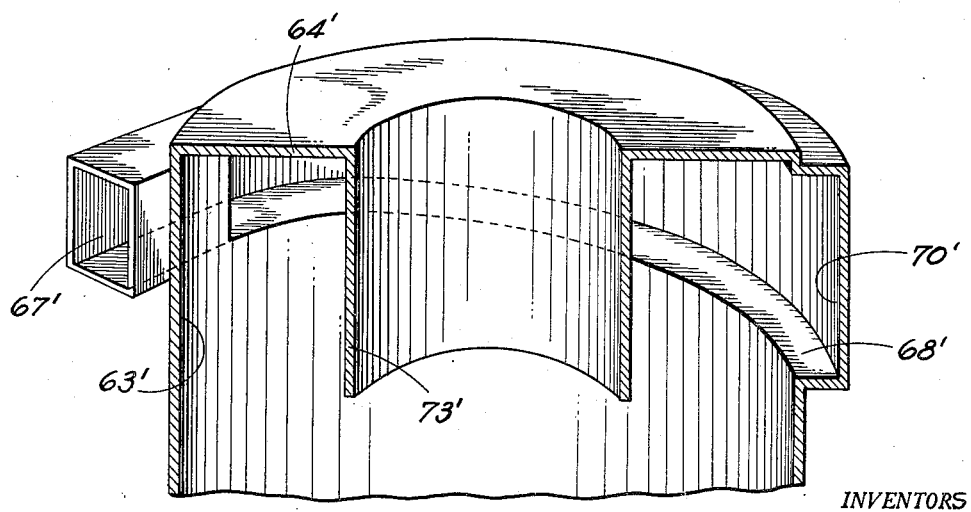
Fig. 12 is a perspective view of a section taken on the plane indicated by the line 12—12 of Fig. 11.

Figs. 11 and 12 show the preferred form of inlet according to the present invention applied to a cylindrical shell to better illustrate the operation and results. It will be understood that the novel inlet of this invention may be applied to a shell of any desired type or shape. As shown in Figs. 11 and 12, the inlet opening 67' is substantially square in cross-section and opens into a cylindrical wall 63'. The inlet is set so that the inner surface of the wall 63' is tangent to a plane parallel to the axis of the inlet and spaced outwardly from the plane defined by the inner edge of the inlet about one-fourth of the width of the inlet. Thus the inner edge of the air stream projected from the straight, square cross-sectioned portion of the inlet is spaced inwardly from the wall 63' about one-fourth of the width of the inlet in the zone indicated by the broken line 120.

The outer vertical wall 70' of the inlet curves around the shell in a spiral path of diminishing radius and merges with the shell wall 63' at a point about 270° around the shell. The bottom wall 68' of the inlet slopes downwardly so as to expand the axial depth of the inlet in proportion to the decrease in the radial width between the outer wall 70' and the inner edge of the air stream indicated by the line 120 so as to maintain the cross-sectional area of the air stream substantially constant.

Thus the inlet is a nozzle substantially square in cross-section at the entrance end tapering to a wide thin stream having an axial width about twelve to sixteen times its radial thickness at the outlet end, which is wrapped around the shell for about 270°. No inner wall of the inlet nozzle is needed since the air stream is held by centrifugal force against the outer wall. In this way the air stream is delivered in a wide thin sheet against the inner wall of the shell, but without the use of a narrow nozzle opening which would catch small objects entering the separator and become plugged or otherwise interfere with the operation. In a specific example, the inlet 67' is made ⅞ of an inch square, and is set so that the inner edge of the air stream, indicated by the line 120, is spaced ¼ of an inch in from the wall 63'. Thus at the point where the outer wall 70' merges with the wall 63', and the bottom wall 68' disappears, the air stream is ¼ of an inch in radial thickness and about 3 inches in axial length. Thus any object which can pass through the square portion of the inlet can enter the separator without danger of catching and plugging the inlet. On the other hand, if the air stream were directed into the shell through a nozzle ¼ of an inch wide and 3 inches high, any object which will not pass through a slot ¼ of an inch wide would catch in the nozzle, collect dirt and lint, and ultimately plug the inlet.

The inlet illustrated in Figs. 5 to 8 operates in the same way and is incorporated into the separator in the same way, although the walls are cut away in part by their intersection with the ellipsoidal wall 63. It is to be understood that the novel inlet may be used with any desired shape or type of shell into which it is desired to project the air in a wide thin stream.

The top wall 64 of the shell 60 is formed with an outlet pipe 73 extending axially downwardly into the shell 60 to a point beyond the point 69 at which the bottom wall 68 of the inlet merges into the ellipsoidal portion 63. Preferably the outlet pipe 73 extends substantially to the junction between the ellipsoidal portion 63 and the cylindrical portion of the shell 60. A baffle plate 74 is supported within the shell 60 at or near the junction between the shell 60 and the dust receptacle 62. The baffle plate 74 is imperforate and has its periphery spaced from the interior of the shell 60 and the dust receptacle 62 by a narrow annular space 75. Preferably the baffle plate 74 is secured to the lower end of a rod 76 which has its upper end secured in a boss 77 in the cap member 61 and which extends axially through the outlet pipe 73 and the shell 60. This supporting arrangement for the baffle plate 74 permits the annular opening 75 to be uninterrupted circumferentially and also leaves the upper end of the dust receptacle 62 unimpeded.

It is to be understood that the baffle may be mounted in other ways and if, for example, it is mounted from the dust chamber 62 or some other part, it is unnecessary to extend the rod 76 through the outlet 73 and the interior of the separator.

The cap 61 may be formed with an ellipsoidal shape, as shown, in continuation of the external surface of the ellipsoidal portion 63 to improve the appearance of the dust separator. An outlet conduit 78 opening through a side wall of the cap 61 is secured to the tubular member 53, as by a flange 79 welded to the tube 53 around an opening 78a therein which registers with the outlet conduit 78. Immediately above opening 78a in conduit 53 a plug 125 is installed to prevent flow of air above this point in conduit 53. A similar plug 126 is mounted in the tubular member 52 above the inlet opening 67. The connections of the inlet conduit 65 to the tube 52 and the outlet conduit 78 to the tube 53 may constitute the sole support for the shell 60 and cap 61, as shown, or additional supports may be provided if desired.

A cross member 80 secured to the two swivel fittings 54 extends across the space between the tubes 52 and 53 below the bottom of the dust receptacle 62 and is formed with a spring seat 81 carrying a spring 82 adapted to engage in a socket 83 on the bottom of the dust receptacle 62. The dust receptacle 62 at its upper end has a sliding fit with the lower open end of the shell 60 so that it may be pushed down against the spring 82 and removed laterally from the tubes 52 and 53 for emptying. When in place the dust receptacle 62 is held against the bottom of the shell 60 by the spring 82 and by the reduced pressure which exists in the separator in operation.

When the cleaner is operated dirt laden air enters the nozzle 22, passes through the passage 58 into the conduit 57, through the bushing 55, the inlet tube 52, and into the separator 59 through the inlet opening 67. Clean air leaves the separator through the outlet pipe 73, the interior of the cap 61, the outlet conduit 78, the tube 53, the bushing 56, and passes through the fan inlet conduit 46 into the interior of the motor housing 37. The clean air is permitted to pass around the motor to cool the same and enters the fan housing through an axial opening in the support 36. The fan blades 38 drive the air radially into the rim 35, from which it enters the interior of the cover plate 43 through the hole or holes 47 and is discharged to atmosphere through the opening 45.

In the separator itself, the dust laden air stream entering the shell 60 through the inlet passage 67 is caused to flatten radially and expand axially by centrifugal force, which increases progressively as a result of the diminishing radius of the wall 70. As the air stream comes into contact with the ellipsoidal wall in its first revolution about the shell, the ellipsoidal wall 63 converts a part of the centrifugal force developed by the rapid whirling motion of the air into an axial force, driving the air into a downward helical path along the wall of the shell 60. The curvature and extent of the ellipsoidal wall 63 are selected with respect to the air velocity of a particular separator so as to impart sufficient momentum to the air stream to drive it downwardly along the wall of the shell 60 past the lower end of the outlet pipe 73 and against the baffle 74.

The centrifugal force developed by the circumferential component of the movement of the air stream urges the dust and dirt entrained in the air radially outward toward the wall of the shell 60 as the air stream moves downwardly in the helical path. By reason of the fact that the dust laden air stream is free to spread axially with a consequent reduction of its radial depth under the influence of the centrifugal force, the distance through which each dust or dirt particle in the incoming air stream must move in order to reach the wall of the shell 60 is reduced to a minimum. The rate at which any particular particle of dust or dirt moves radially outward through the air under the influence of the centrifugal force depends upon its specific gravity and upon the relation between the mass and shape of the particle, which in turn determines the resistance to the movement of that particular particle through air of a given density and viscosity. The heavier particles, and those whose shape is such as to minimize air resistance, are quickly projected through the air stream to the wall of the shell 60. Lighter particles and those having a greater air resistance move radially outward at a slower rate.

When the downwardly moving helical stream of air admitted from the inlet reaches the baffle 74 substantially all of the air is drawn inwardly by the reduced pressure in the center of the separator in a generally spiral path above the baffle 74, and then is drawn upwardly in a helical path substantially smaller in radius than the first mentioned helical path toward the outlet pipe 73. This reversal of the axial direction of movement of the air is effected by a combination of factors. In the first place the force which produces the movement of the air through the separator results from the fact that the pressure in the outlet tube 73 is less than the pressure in the inlet conduit 67, so that a flow of air is established from the inlet 67 to the outlet pipe 73. Since the low pressure area produced in the separator below the inlet pipe 73 is confined by the imperforate baffle 74, there is substantially no pressure difference acting to urge the air to pass through the annular opening 75 into the dust chamber 62, and at the same time a substantial pressure difference exists above the baffle 74 urging the air radially inward along the upper surface of the baffle 74. The air in the downwardly moving helix along the wall of the shell 60 which is located radially inward from the edge of the annular opening 75 strikes the baffle 74 so that its momentum maintaining its movement in a downward direction is absorbed and the only force resisting movement of the air radially inward toward the reduced pressure area in the center of the shell is the centrifugal force resulting from the whirling of the air.

Particles of dirt and dust which are close to the wall of the shell 60 during the downward helical movement of the incoming air stream are projected in a continuation of their helical path downwardly along the wall of the dust chamber 62 and through the annular gap 75. The air in the dust chamber rotates in the same direction as the incoming air in the outer helix so that the dust particles are transferred smoothly and without turbulence from the helically or spirally moving air above the baffle to the rotating body of air below the baffle. The momentum imparted to the particles of dust and dirt moving in the helical path along the wall of the shell 60 and the dust container 62 causes those particles to move through the gap 75 and to be projected to the bottom of the dust container 62. The dust particles are not carried back to the shell 60 because there is insufficient axial movement of the air in the container 62 to entrain the dust.

The main body of the air stream, and any particles of dust and dirt which did not come close to the wall of the shell 60 during the downward helical movement of the air stream, move inwardly above the baffle 74 and then upwardly in a helical path toward the outlet pipe 73. In this movement the air stream has a circumferential component of movement in the same direction as the air at the outer portion of the shell 60, and an axial component of movement in the opposite direction. The linear rotational velocity of the air moving downwardly in the outer helix, or cyclone, is not reduced by drawing the air into the upwardly moving helix or cyclone, and since the radius is reduced the angular velocity of the air is increased and centrifugal force developed in the inner helix is increased. This increase in the centrifugal force applies an increased force to entrained dirt and dust particles, tending to force them radially outward into the downwardly moving outer helix.

Since the entire body of air in the shell 60 above the baffle 74 is moving circumferentially in the same direction, the static pressure of the air has a maximum value adjacent the wall of the shell 60 and decreases considerably to a minimum value at the center of the shell. Thus the density and viscosity of the air in the inner helix or cyclone is substantially less than the density and viscosity of the air adjacent the wall of the shell 60, so that the air resistance to the movement of any particle of dust or dirt is less in the inner cyclone than in the outer cyclone. Thus particles whose shape is such that they move through the air stream slowly in the outer cyclone under a given centrifugal force move more rapidly through the air in the inner cyclone under the same centrifugal force. This reduction in density and viscosity in the air in the inner cyclone, combined with the increased centrifugal force existing in the inner cyclone, increases by many times the speed at which particles of dust and dirt are separated from the air and projected radially outward. In addition the long length of the inner cyclone, caused by the fact that it starts at the baffle, gives the dirt time to pass outwardly into the outer helical air stream before the inner cyclone air enters outlet pipe 73.

Other factors also increase the effectiveness of the dust and dirt separation in the inner cyclone as compared to the outer cyclone. Since the pressure and density of the air entering the outlet pipe 73 is less than the pressure and density of the incoming air, and because air in a confined passageway expands in the direction of its movement, the linear velocity of the air in the inner cyclone 73 is greater than the linear velocity of the entering air since the mass of air leaving the separator is equal to the mass of air entering the separator. This increase in linear velocity further increases the centrifugal force.

Dust and dirt particles which remain entrained in the air entering the inner cyclone above the baffle 74 are projected radially outward at a substantially increased velocity and with sufficient momentum to pass through the stream of incoming air forming the outer cyclone to a point near the wall of the shell 60, where they agglomerate with other dust and dirt particles and move downwardly in the outer helical path through the annular opening 75 into the dust chamber 62. In this way particles having a specific gravity or air resistance such that they cannot be separated successfully from the air stream in the outer cyclone, are not only separated from the air in the inner cyclone, but are thrown outwardly with sufficient force to pass through the outer cyclone into the stream of dust and dirt moving along the wall of the shell 60 and are deposited in the dust chamber 62.

Thus in operation the entire body of air in the shell 60 is rotating rapidly in one direction, the outer portion of the air having a downward movement in a helical path and the inner portion having an upward helical movement. The air pressure in the shell is greatest around the wall of the shell and decreases to a minimum at the center, the variation in pressure having an exponential relation to the radius because of the increased centrifugal force of the upwardly moving inner portion of the body of air. The imperforate baffle 74 seals off the lower end of the inner cyclone and the low pressure area. The incoming air is given sufficient momentum both circumferentially and downwardly by the tangential inlet and the ellipsoidal wall portion 63 to drive the air stream in a helical path to the baffle 74, and to prevent any appreciable portion of the incoming air from short-circuiting to the low pressure area in the inner cyclone until it substantially reaches the baffle 74. Thus the baffle may be located at any distance below the lower end of the outlet pipe 73 within which these conditions may be maintained with a given flow of air. Preferably the baffle is located as far from the lower end of the outlet pipe 73 as is possible without impairing the air velocity by an excessive amount of friction against the walls of the separator so as to obtain the maximum possible length of the inner cyclone. However, the distance of the baffle 74 from the lower end of the outlet pipe 73 is limited by the available pressure for operating the separator since increasing this distance increases the pressure drop through the separator required to maintain the air velocity.

The size of the baffle 74 and the radial width of the gap 75 are determined first by the requirement that the baffle shall extend across and seal off the extreme low pressure area created by the inner cyclone, and second by the requirement that the extent of axial flow of the air in the dust chamber 62 shall be so small as not to again entrain in the air stream dust particles deposited in the dust chamber.

The annular gap 75 permits only a relatively small percentage of the total quantity of air moving downwardly in the outer helix to enter the dust chamber 62 with the stream of dust and dirt concentrated along the wall of the shell 60, so that substantially all of the air in the outer helix is separated from the dust and dirt and moves inwardly in a substantially spiral path above the baffle 74. This separation of the air from the dirt at the annular gap 75 is effected primarily by pressure, as distinguished from a mechanical skimming action. The body of air confined in the dust chamber below the baffle 74 is entrained by, and caused to rotate with the air in the outer cyclone in the shell 62. Thus for a short distance down from the baffle and for a radial distance from the separator wall equal to the annular gap between the baffle and the separator wall, the pressure decreases with the radius in the dust chamber 62 at substantially the same rate as the pressure varies with the radius in the outer cyclone in the shell 60, so that the pressure is the same above and below the annular opening 75 at any point in the radial depth of the annular opening. Thus so long as the outer edge of the baffle 74 is located radially outward beyond the point at which the pressure in the shell 60 is substantially affected by the inner cyclone, there is no substantial difference in the pressure above and below the gap 75. With no pressure difference across the annular opening there is no appreciable air flow across this gap to carry entrained dirt from the dirt container back into the separator and the operation at the gap 75 is therefore primarily a smooth interchange of the dust and dirt particles from a stream of air in the shell 60 moving helically and spirally to a body of air in the dust chamber 62 rotating at the same speed as the air in the shell 60 without eddies or turbulence or substantial axial movement of air through the gap 75.

There is therefore no close critical limit to the radial extent of the gap 75, and it may be made sufficiently wide to permit the free passage of cigarette butts and similar debris that may be picked up by the nozzle into the dust chamber 62.

The interaction of the inner and outer cyclones within the separator itself involves other novel effects contributing to the high separating efficiency of the present invention. The drawing of the air from the outer cyclone into the inner cyclone against the action of centrifugal force reduces the pressure, increases the linear velocity of the air in the inner cyclone and reduces the radius of the whirling motion of the air. The centrifugal force is thereby increased, producing a large reduction in pressure near the axis of the inner cyclone, and a large pressure drop across the separator. Contrary to the usual practice of attempting to keep the pressure drop across the separator as low as possible in order to conserve power, in the present invention a high pressure drop is used to take advantage of the accompanying phenomena.

Thus in accordance with this invention the centrifugal force opposing the withdrawal of the air from the separator is maintained at such magnitude as to cause a pressure drop exceeding 20 inches of water across the separator. The reduction in pressure near the axis of the inner cyclone greatly exceeds the drop across the separator; for example, with a pressure drop across the separator of 30 inches of water there is a negative pressure of about 60 inches of water near the axis of the inner cyclone. Under these conditions a number of cumulative effects combine to give complete separation for all practical purposes. The reduced density of the air in the inner cyclone increases the difference between the specific gravities of the air and the dust particles. Thus a given centrifugal force imparts a greater outward acceleration to dust particles. At the same time the reduction in pressure is accompanied by a reduction in temperature, which reduces the viscosity, and an increase in relative humidity of the air in the inner cyclone. Since the dust particles are slightly hygroscopic, the increase in relative humidity causes them to pick up additional water from the air, thereby increasing their weight. While these various effects are insignificant in the pressure ranges ordinarily used in air cleaning apparatus and processes, their combination results in an exponential curve that rises very rapidly to an effective value when pressure drops across the separator exceeding 20 inches of water are employed in accordance with this invention.

In a particular separator for a vacuum cleaner of the type disclosed, equipped with a fan which produces a negative pressure of 42 inches of water with the nozzle engaging the rug in normal position, it is found that excellent results are obtained with a pressure drop across the separator of 30 inches of water. With the cleaner nozzle, fan, motor, and conduits arranged to handle 46 cubic feet of air per minute, the interior diameter of the shell 60 is made about 4 and $\frac{9}{32}$ inches. The inlet conduit 67 is made ⅞ of an inch square and has an air inlet velocity of about 9,000 feet per minute. In this particular separator the baffle 74 is located 6 inches below the top wall 64 of the shell 60 and the outlet pipe 73 projects 2 inches below the wall 64 leaving a space of 4 inches from the lower end of the outlet pipe to the baffle. The baffle 74 is made of such diameter that the radial width of the gap 75 is from about ¼ to ½ of an inch. The outlet pipe 73 in this particular embodiment is cylindrical and has an inside diameter of 1⅜ inches. The curvature in cross section of the ellipsoidal portion 63 corresponds approximately to a circular arc with a radius of 2$\frac{23}{32}$ of an inch struck from a point on the opposite side of the axis about $\frac{5}{32}$ of an inch below the lower end of the outlet pipe 73. It will be understood that the invention is not limited to these dimensions, or to any of them, but that these represent suitable dimensions and proportions for a separator to be used with the fan and cleaner having the foregoing characteristics.

The pressure drop across the separator is also affected by the size of the outlet pipe 73 relative to the diameter of the shell 60 and the size of the inlet opening 67. It is found that as a general proposition the operating efficiency of the separator increases with an increase of the pressure drop across the separator. However, with a separator of the foregoing dimensions and proportions producing a pressure drop of 30 inches of water with an air flow of 46 cubic feet per minute, the separator removes substantially in excess of 99.99% by weight of household dust picked up by the cleaner nozzle from rugs. In other words, if during the life of a vacuum cleaner embodying this invention it removed 10,000 pounds of dirt from the user's home, less than one pound of dirt would escape the separator. The separation of dust and dirt is so complete that the discharge from the fan may be returned directly to the room without the use of supplemental filters or the like.

A slightly modified form of separator embodying this invention and capable of carrying out the new method of separation described above is shown in Figs. 9 and 10. This separator comprises a dust separating chamber 90 defined by an annular shell 91, the upper part 92 of which is a frustum of a cone, and the lower portion 93 cylindrical.

The separated dust is received in a collecting chamber 94 formed by a cup 95 retained against a flange 96 of the shell 91 by toggle clamps 97 fixed to the shell and engaging lugs 98 on the cup.

The chambers 90 and 94 are separated by a baffle disk 99 which is secured by a nut 100 to a supporting rod 101 fixed in the axis of the separator. An annular passage 102 between the margin of the disk 99 and the cup 95 provides for flow of dust from the separating chamber into the collecting chamber. The baffle may be of conical form, as illustrated, or may be flat as shown in Fig. 5. The upper end closure of the chamber 90 and the air outlet of the separator are provided by a fitting comprising the outlet 103 and an annular body 104 fitting in the upper end of the shell 91 and secured therein by welding or in any other suitable manner.

The air outlet for the separating chamber consists of a pipe 105 mounted centrally in a disk 106 which is secured in the outlet fitting 104 and closes the lower end thereof except for the pipe 105. The rod 101 which supports the baffle plate 99 is fixed in a bushing 107 mounted in the center of the cap 104, the rod 101 thus passing through the center of the pipe 105.

Withdrawal of air through the connection 103 and outlet pipe 105 creates a vacuum within the separator, causing an inflow of air through the inlet 110, which comprises a straight entrance pipe 111 of rectangular cross section tangent to the conical portion 92 of the shell adjacent the top thereof, and a spiral portion 112 of gradually diminishing radius which extends approximately 270° around the separator casing. The upper wall of the inlet 110 is preferably in a plane perpendicular to the axis of the separator. The lower wall 113 of the inlet, however, inclines downwardly from the end of the straight section 111 of the inlet, the inclination being about one part in four. The bottom wall 113 of the spiral inlet thus intersects the conical wall 92 of the separator shell along a conical helix indicated by the numeral 114 in Fig. 10. When the outer vertical surface of the spiral inlet 112 meets the cone 92, these surfaces intersect along an ascending conical spiral indicated by the line 115 of Fig. 10. It will be noted that the outlet pipe 105 extends below the lowest point of the inlet spiral 89.

The increasing depth and diminishing radius of the spiral portion 112 as it extends around the casing operates in the same way and achieves the same results as the inlet illustrated in Figs. 5-8. The air stream is caused to spread axially in a downward direction, and is delivered smoothly against the conical wall portion 92, which directs the air into a downward helical path as in the embodiment shown in Figs. 5-8.

In this form of separator, as in the embodiment shown in Figs. 5-8, the air is forced to flow downwardly in an outer cyclone and upwardly in an inner cyclone, the dust and dirt passing smoothly and without turbulence into the dust collecting chamber below the baffle.

Both forms of separator shown, and other embodiments which may be made embodying the principles and carrying out the method of this invention, are of such high efficiency for their size and for the operating pressure required that they may be used in vacuum cleaners and the like without supplemental filters. By the combination disclosed, it is possible to design the fan for maximum efficiency, since the air is cleaned before it enters the fan and it is not necessary to space the fan blades from the casing and from each other sufficiently to permit the passage of debris picked up by the nozzle. It is also preferred to use with the separator a fan and motor assembly having a rising characteristic; that is, an assembly which produces a greater pressure drop as the inlet is restricted.

Thus for example, with the cleaner and separator having the characteristics and dimensions given above, the fan and motor are arranged to produce a negative pressure of 42 inches of water with the nozzle engaging the rug in normal position. The separator is constructed with a pressure drop of 30 inches of water and there is a pressure drop of 6 inches at the nozzle and 6 inches in the hose and connections. If the cleaning nozzle should be forced down firmly against the rug or other surface being cleaned, the pressure drop across the nozzle is increased and air volume reduced. The reduced flow of air through the separator results in reduced pressure drop across the separator, but the rising pressure characteristic of the fan combined with reduced friction in the piping holds the separator above the 20 inch drop found to be a critical value. Thus the fan and motor are preferably constructed so that as the flow of air is reduced the fan is capable of producing a maximum negative pressure of about 60 inches of water, so that there is always sufficient pressure difference to maintain the pressure drop above 20 inches across the separator regardless of the extent to which the nozzle is pressed against the surface being cleaned. In this way the separating efficiency of the separator, which varies in general with the pressure drop across the separator, is maintained substantially constant regardless of the variations in the flow of air.

While the present separator has efficiency such that supplemental filters are not required, it is to be understood that the invention is not limited to a construction in which there are no supplemental filters. For example, to avoid the possibility that the minute quantities of dust passed by the separator during a long period of use may collect in the motor or fan casing and be shaken loose and discharged in a puff, it is possible to incorporate supplemental filters on the outlet side of the separator which would prevent the discharge of fine dust accumulated over a long period, but which would not need to be changed during the normal use of the cleaner to maintain the operating efficiency. In the embodiment disclosed, this danger is avoided by the arrangement of the atmospheric openings 45, which are directed downwardly toward the surface being cleaned.

It will be understood that the novel separator disclosed and the novel method of separating solid matter from gas may be employed for many other purposes and that many variations and modifications, both in the separator and in the combination of the separator with a vacuum cleaner, may be resorted to without departing from the scope of the invention as defined in the following claims.

What is claimed is:

1. A device for cleaning air flowing therethrough comprising a casing in the form of a surface of revolution and defining a separating chamber therein, an air inlet tangential to said casing at the first end thereof, an air outlet tube extending into the first end of the chamber axially and having its mouth normal to the axis of the chamber, said tube having an axial extent exceeding the axial extent of the said air inlet, means defining an annular peripheral dust outlet at the second end of the chamber, and a closed dust receiver into which the dust outlet opens, the portion of the casing adjacent the inlet tapering toward the first end, and the air inlet including a spiral portion of decreasing radius and increasing depth merging into the tapered portion of the casing.

2. A device for cleaning air flowing therethrough comprising a casing in the form of a surface of revolution and defining a separating chamber therein, an air inlet tangential to said casing at one end thereof, an outlet tube for cleaned air extending coaxially of the chamber in said one end thereof, the portion of the casing adjacent to the said inlet tapering toward said one end, said tapering portion of the casing having an axial extent exceeding the axial extent of said inlet, said air inlet including a spiral portion of decreasing radius and merging into the tapered portion of the casing, means defining an annular peripheral dust outlet at the other end of the chamber and a closed dust receiver into which the said dust outlet opens.

3. A device for cleaning air flowing therethrough comprising a casing in the form of a surface of revolution and defining a separating chamber therein, an air inlet tangential to said casing at one end thereof, said inlet merging with the casing in a spiral portion of decreasing radius and increasing depth, said spiral portion being open throughout its length toward the axis of the chamber to provide unrestricted passage into the chamber for air-carried objects having a cross section corresponding to the entrance cross section of said inlet, an air outlet tube extending into said one end of the casing axially thereof and having a mouth normal to the axis of the chamber, said outlet tube having an axial extent exceeding the axial extent of said spiral portion, means defining an annular peripheral dust outlet at the other end of the chamber and a closed dust receiver into which the dust outlet opens.

ARCHIBALD H. DAVIS.
CHARLES N. HAY.

REFERENCES CITED

The following references are of record in the file of this patent:

UNITED STATES PATENTS

| Number | Name | Date |
|---|---|---|
| 460,061 | Pratsch | Sept. 22, 1891 |
| 755,430 | Allington | Mar. 22, 1904 |
| 878,126 | Derby | Feb. 4, 1908 |
| 964,717 | Verrell | July 19, 1910 |
| 1,108,248 | Schmitz | Aug. 25, 1914 |
| 1,342,152 | Bennett | June 1, 1920 |
| 1,344,146 | Peck | June 22, 1920 |
| 1,461,173 | Bennett | July 10, 1923 |
| 1,603,020 | Boldt et al. | Oct. 12, 1926 |
| 1,607,744 | Mabie | Nov. 23, 1926 |
| 1,826,798 | Lee | Oct. 13, 1931 |
| 1,929,025 | Leathers | Oct. 3, 1933 |
| 2,010,128 | Arnold | Aug. 6, 1935 |
| 2,019,895 | Dow | Nov. 5, 1935 |
| 2,222,930 | Arnold | Nov. 26, 1940 |
| 2,295,101 | Dunham | Sept. 8, 1942 |

FOREIGN PATENTS

| Number | Country | Date |
|---|---|---|
| 176,352 | Switzerland | July 1, 1935 |

OTHER REFERENCES

"Flow Pattern and Pressure Drop in Cyclone Dust Collectors," Shepherd and Lapple Industrial and Engineering Chemistry, August 1939, pages 972–984.